W. B. DUNBAR.
VARIABLE SPEED PULLEY.
APPLICATION FILED JUNE 2, 1915.
1,173,787.
Patented Feb. 29, 1916.
2 SHEETS—SHEET 1.
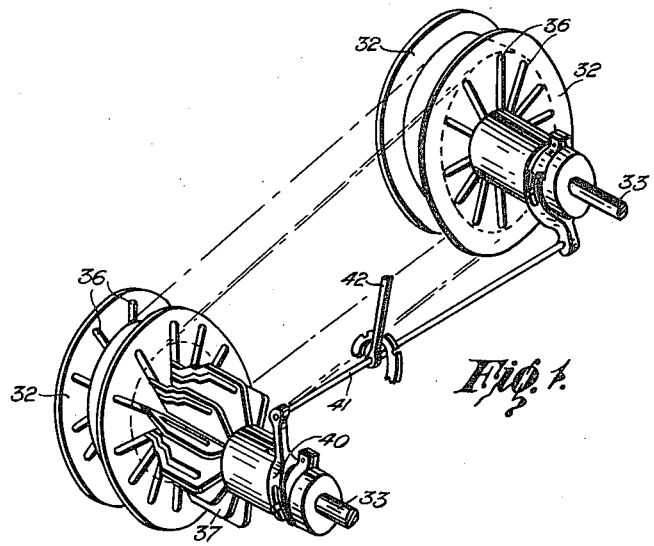
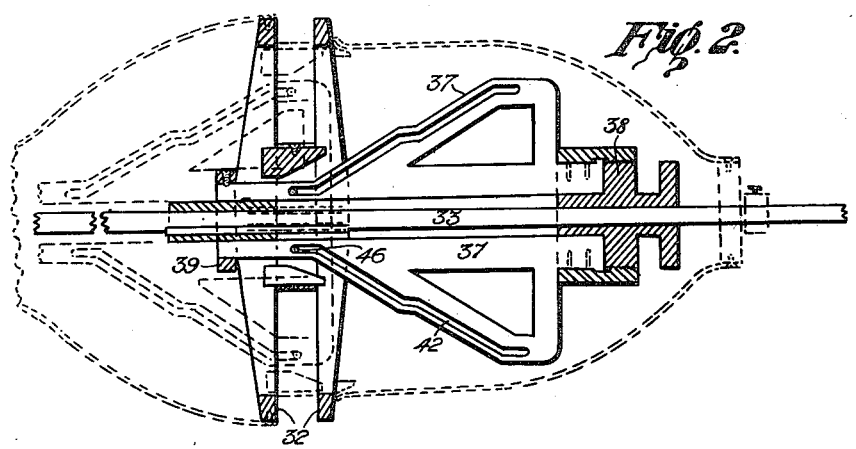
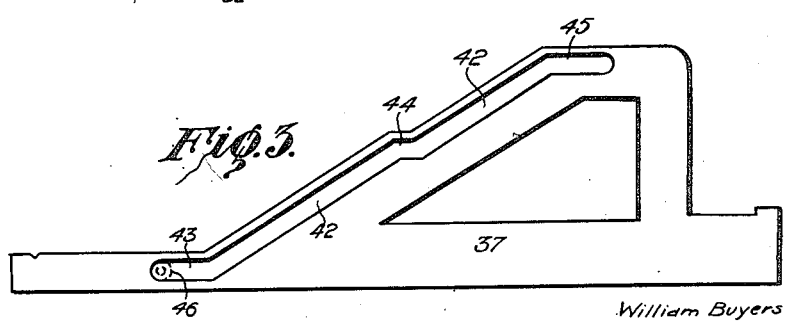
Witnesses.
Isabel Easton
George F Manson
William Buyers Dunbar,
by his Attorney,
Fred Walsh W. B. DUNBAR.
VARIABLE SPEED PULLEY.
APPLICATION FILED JUNE 2, 1915.
1,173,787.
Patented Feb. 29, 1916.
2 SHEETS—SHEET 2.
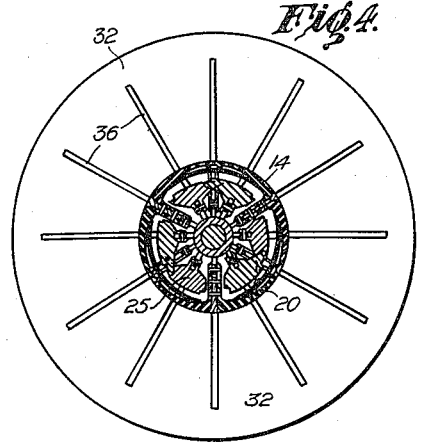
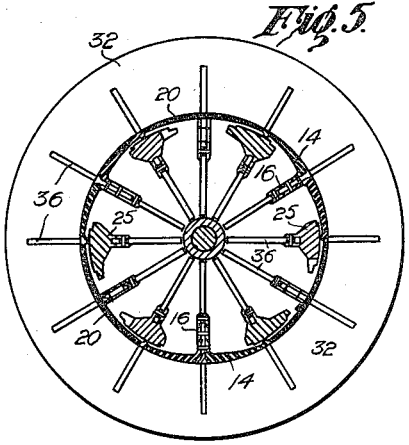
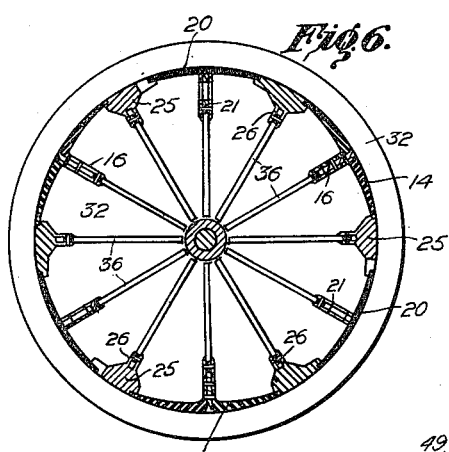
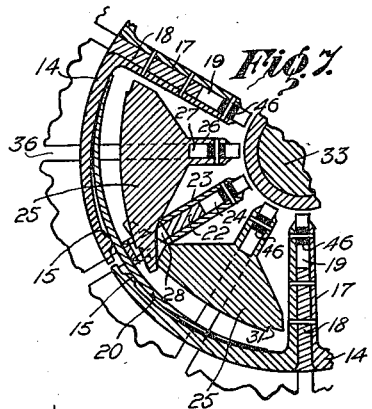
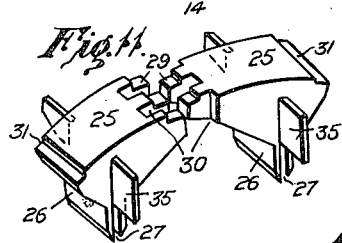
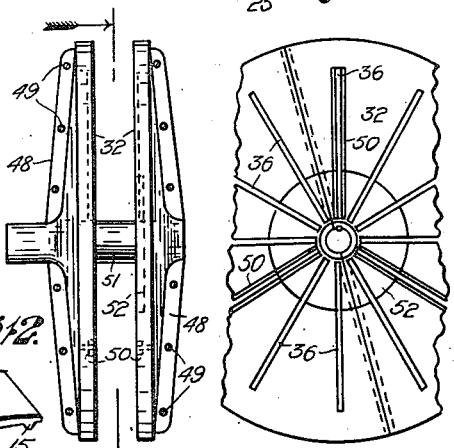
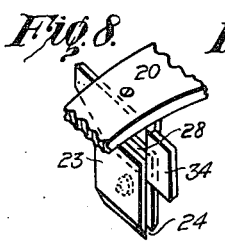
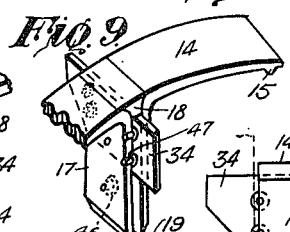
Witnesses
Isabel Easton
George T. Manson
William Buyers Dunbar,
by his Attorney,
Fred Walsh

UNITED STATES PATENT OFFICE.

WILLIAM BUYERS DUNBAR, OF ASHFIELD, NEAR SYDNEY, NEW SOUTH WALES, AUSTRALIA.

VARIABLE-SPEED PULLEY.

1,173,787.   Specification of Letters Patent.   Patented Feb. 29, 1916.

Application filed June 2, 1915. Serial No. 31,655.

*To all whom it may concern:*

Be it known that I, WILLIAM BUYERS DUNBAR, a subject of the King of Great Britain, residing at No. 44 Victoria street, Ashfield, near Sydney, in the State of New South Wales and Commonwealth of Australia, engineer, have invented a new and useful Improved Variable-Speed Pulley, of which the following is a specification.

This invention relates to those pulleys known as variable speed pulleys whose diameter is adapted to be expanded and contracted for the purpose of transmitting different speeds and it has been specially devised in order to provide such a pulley composed of segments adapted to be moved radially wherein at each diameter a complete circular face is formed and wherein the segments are positively operated and adapted to be operated while the pulley is stationary and while it is in motion and which pulley may be used for all the purposes of an ordinary machine pulley and when used in pairs or in combination with a tension pulley fulfil all the functions of a cone or other variable speed pulley and as well in many cases may take the place of expensive change speed gearing.

This improved variable speed pulley has a plurality of segments (having radial stems) peculiarly arranged between a pair of disks or flanges and adapted to be operated by peculiar slidable members or radial leaf devices so that a complete and practically true circular working face is presented at each diameter.

The segments are adapted when the pulley is contracted to its smallest diameter to nest in circularly arranged groups with one group for each required diameter and the outermost group forming the complete pulley face. Upon expansion of the pulley by each step each member of the next inner group of segments takes its place in the complete circle face of the next larger sized pulley. The segments of the first or innermost group are solid with arc faces of the circle of the largest diameter pulley while the segments of the other groups have outer faces of approximately arcs of the circle required but are of more or less springy material and are adapted to be forced outwardly to become arcs of the respective complete circles of one of the set pulleys. Each radial stem of the segments has side guide lugs or rollers and is slotted to take over a radial leaf or member in which is an inclined guide slot stepped at each required diameter and adapted to receive and guide a roller fast in the segment stem. The guide slots of all the stems are set in the same inclination or plane but those of each group are extended to their correct relative distance from the center. The radially set leaves or members pass through radial slots in the disks forming flanges of the pulley and at each end are secured in sliding collars or the like on the pulley spindle one of which is operable. These improved variable speed pulleys will ordinarily be used in pairs relatively oppositely set and operated synchronously so that as one is expanded the other is correspondingly contracted, and the operating devices may be forked levers controlled by a single hand lever or any other suitable device either manually or mechanically operatable. But in order that this invention may be readily carried into practical effect it will now be readily vb now be described with reference to the accompanying drawings in which—

Figure 1 is a perspective view of a pair of improved variable speed pulleys according to this invention in operative relation to each other but uncovered as to its parts. Fig. 2 is a central longitudinal section of the pulley at its smallest diameter without operating gear but with coverings indicated in dotted lines. Fig. 3 is a side elevation of one of the radial leaves or members showing guide grooves therein Figs. 4, 5 and 6 are transverse sections showing the respective positions of the respective segments in forming the pulley of three different sizes. Fig. 7 is a segmental part of Fig. 4 on a larger scale. Fig. 8 shows an outer segment with spring arc. Fig. 9 shows a modified construction of same with stem guide rollers and Fig. 10 is a side sectional elevation thereof. Fig. 11 is a perspective view of interpassing inner segments. Fig. 12 is a side elevation of the pulley embodying modified constructions and Fig. 13 is a face view of the flange thereof.

The segments of the third or outermost group have spring metal heads 14 which when conjoined form the smallest pulley face (see Figs. 4 and 7) and which when the pulley is expanded to larger diameters form part of the respective larger pulley faces (see Figs. 5 and 6). These spring segment heads 14 are conveniently constructed of two members having ridges or beads 15 and having a stem 16 made up of radially set flanges 17 riveted together with a filler 18 to leave a space 19 between them. The second group of segments have also spring metal heads 20 and at the pulley's smallest size they position just inwardly of the heads 14 and contact with the ridges or beads 15 sufficiently to force said heads 14 to the correct arc of the circle. Each second segment head 20 is conveniently a sigle curved spring member secured to stem 21 which consists of a filler 22 between side members 23 leaving spaces 24 and 28 between.

The innermost segments have solid heads 25 the stems 26 preferably being an integral extension with a slot 27 cut therein. The segment heads 25 have each one end adapted in the innermost position to pass into space 28 in the stem 21 of the next segment and these ends are adapted to pass one another say by means of complementary projections 29 and slots 30. And each of these solid segments has an inset or recess 31 at each end of a depth equal to the thickness of the ends of the spring segments 14 and 20 and adapted to receive said ends and to force them outwardly to the correct circle.

The groups of segments are all arranged between a pair of disks forming pulley flanges 32 fast on the pulley spindle 33 and the fillers 18 and 22 of the spring segments 14 and 20 have lugs 34 at each side while the solid segments have lugs 35 at each side taking into opposite radial guide slots 36 in each of said pulley flanges 32. These slots 36 may be equi-angularly disposed as shown though when more than three changes of size of pulley are required they would be suitably positioned to correspond with the number and size of the segments.

The radial leaves or members 37 one for each segment pass through slots 36 being all secured at their ends in slidable collars 38 and 39 operatable by fork 40 and lever rod 41 adapted to be operated manually or otherwise. Each radially set leaf or member 37 has an inclined guide slot 42 joining steps 43, 44 and 45 and in which each segment stem has a fast roller 46 slidably fitting within its respective inclined guide slot 42. The steps 43, 44 and 45 are positioned relatively to said rollers 46 and to the length of the segment stems of each group so that each segment will rest or step into its required position as each variable size of pulley is attained. Thus the innermost step 43 in each slot 42 is in the same circle while at the first larger size the steps 44 for the segments 14 are in a smaller circle than those for the segments 20 and 25 while at the outermost diameter the steps 45 for each group are in different circles to direct the segments to their correct relative positions.

To minimize friction between the faces of the pulley flanges 32 and the sides of the segments some or all of the stems of said segments may be provided with rollers 47 as shown in Fig. 9 arranged so that they just contact with the inner face of the pulley flange on each side.

This improved variable speed pulley may be applied to assembled machines or elsewhere and may be conveniently slipped on the shaft by having the pulley flanges 32 split and joined by means of butting flanges 48 secured together by screws or bolts 49 while the sliding collars are similarly split and secured together by suitable screws. The sides of the segment stems may be extended or have lugs at each side and the slots in the pulley flanges have guide recesses 50 at each side to receive them and also the boss 51 of one pulley flange 32 may have a flange 52 on it fitting into complementary recess in the meeting flange and be held therein by screws.

In operation assuming that the pulley is contracted to its smallest diameter the segments nest in groups as shown in Figs. 4 and 7. Upon sliding movement of the members 37 longitudinally each segment is forced outwardly by reason of its roller 46 traveling up the inclined slot 42 until the rollers of the outer segments 14 reach their step 44 and stop while the rollers of the two inner groups of segments 20 and 25 progress until they reach their step 44 thus placing the segments 20 in the spaces between the segments 14 while the innermost segments 25 contact with the ridges or beads 15 on said segments 14 which are forced to the correct circle as shown in Fig. 5. Upon further similar movement of the members 37 the segments are all again advanced in concentric relation to each other until the rollers 46 of segments 14 and 20 reach the outermost step 45 when they stop while the innermost segments 25 move outwardly until they fit into the spaces between said segments 14 and 20 whose ends take into the insets 31 and are forced outwardly to the correct circle as shown in Fig. 6. Upon the movement of the members 37 in the opposite direction the action is reversed and the segments are positively drawn into positions as before set forth.

The pulleys will usually be applied in pairs as shown in Fig. 1 each provided with an operatable fork 40 with a connecting rod 41 between having say a hand control lever 42 with locking quadrant so that as one pulley is contracted the other one is expanded and the belt maintained at the same tension. But of course it will be readily understood that a single one of these pulleys might be used in combination with a tension or jockey pulley. And further the control mechanism may be provided with stops or the like to correspond with the different diameters of the pulley.

What I claim as my invention and desire to secure by Letters Patent is:—

1. In a variable diameter pulley, a pair of spaced flanges, a plurality of groups of segments movable radially between said flanges, the segments of one of said groups inclosing the segments of another of said groups when said pulley is in its contracted position and forming a substantially complete cylindrical surface, said segments of the first named group being resilient and adapted to form with the segments of a second group upon radial outward movement of said groups a cylindrical surface of increased diameter, and means for moving said segments outwardly.

2. In a variable diameter pulley, a pair of spaced flanges, three or more groups of segments mounted between said flanges for radial movement, the segments of one of said groups inclosing the segments of the other of said groups when the pulley is in contracted position and forming a substantially complete cylindrical surface, the segments of each of the other groups filling the spaces between the segments of the first named group upon radial outward movement of the groups, the segments of all but one of said groups being resilient and the segments of each of said groups being adapted to engage each other upon radial outward movement thereof to form cylindrical surfaces of successively increasing diameter and means for moving said segments outwardly.

3. In a variable diameter pulley, a pair of spaced flanges, a plurality of segments mounted for radial movement between said flanges, said segments forming outermost, intermediate, and inner groups, the segments of the outermost group inclosing the segments of the other two groups and forming a substantially complete cylindrical surface when the pulley is in its contracted position, the segments of the intermediate group being adapted to engage with the segments of the outermost group at their ends thereof upon a partial outward movement of said segments to form a pulley of increased diameter, said innermost group being adapted to fill the spaces between the other two groups on a second outward movement of said segments, the segments of the outermost and intermediate group being resilient whereby they assume a curvature of increased radius at each successive outward movement thereof and means for moving said segments outwardly.

4. A variable diameter pulley comprising a pair of spaced flanges, a plurality of groups of segments comprising outer, intermediate and inner groups, said flanges having a plurality of radially disposed slots therein, said segments each having lugs passing through the slots in the flanges and being provided with stems, members having inclined surfaces engaging said stems to move said segments outwardly upon movement of said members in a direction parallel to the axis of the pulley, the segments of said outermost and intermediate group being resilient and adapted to engage each other and the segments of the inner group to form substantially complete cylindrical surfaces in each position of the pulley.

5. A variable diameter pulley comprising a pair of spaced flanges, a plurality of groups of segments comprising outer, intermediate, and inner groups, said flanges having a plurality of radially disposed slots therein, said segments each having lugs passing through the slots in the flanges and being provided with stems, members having inclined surfaces engaging said stems to move said segments outwardly upon movement of said members in a direction parallel to the axis of the pulley, the segments of said outermost and intermediate group being resilient and adapted to engage each other and the segments of the inner group to form substantially complete cylindrical surfaces in each position of the pulley, a shaft upon which said pulley is mounted, and a sliding collar on said shaft for actuating said members.

6. A variable diameter pulley comprising a pair of spaced flanges, a plurality of groups of segments comprising outer, intermediate and inner groups, said flanges having a plurality of radially disposed slots therein, lugs on each of said segments passing through the slots in the flanges, stems secured to each of said segments, members having inclined surfaces engaging said stems to move said segments outwardly upon movement of said members in a direction parallel to the axis of the pulley, the segments of said outermost and intermediate group being resilient and adapted to engage each other and the segments of the inner group to form substantially complete cylindrical surfaces in each position of the pulley, the stems of the intermediate group and the ends of the segments of the inner group having recesses therein, the ends of the segments of the inner group engaging in the corresponding recesses in the ends of other segments of this group, said ends passing through the recesses in the stems of the intermediate group when said pulley is in its fully contracted position.

In testimony whereof I have signed my name to this specification in the presence of two subscribing witnesses.

WILLIAM BUYERS DUNBAR.

Witnesses:
GEORGE H. HANSON,
PERCY NEWELL.